United States Patent [19]
Mears et al.

[11] Patent Number: 5,752,674
[45] Date of Patent: May 19, 1998

[54] SENSOR ICE SHIELD

[75] Inventors: John S. Mears; Ronald A. Bulow. both of Cincinnati; David L. Joyce. West Chester; Kevin H. Kast. Cincinnati, all of Ohio

[73] Assignee: General Electric Company. Cincinnati, Ohio

[21] Appl. No.: 700,955

[22] Filed: Aug. 21, 1996

[51] Int. Cl.⁶ .................................................. B64D 15/00
[52] U.S. Cl. .................... 244/134 R; 244/134 F; 60/39.093; 73/706
[58] Field of Search .................. 244/134 R, 134 E, 244/134 F; 374/208, 209; 60/39.093, 39.091; 73/706, 866.5

[56] References Cited

U.S. PATENT DOCUMENTS

| | | | |
|---|---|---|---|
| 2,182,530 | 12/1939 | Baer | 244/134 F |
| 3,253,404 | 5/1966 | Tonnies | 244/134 R |
| 3,329,377 | 7/1967 | Peterson et al. | 60/39.092 |
| 3,535,930 | 10/1970 | Rees | 244/134 R |
| 3,621,714 | 11/1971 | Puccinelli | 244/134 E |
| 4,358,075 | 11/1982 | Antonov | 244/134 R |

*Primary Examiner*—Andres Kashnikow
*Assistant Examiner*—Tien Dinh
*Attorney, Agent, or Firm*—Andrew C. Hess; Nathan D. Herkamp

[57] ABSTRACT

A system is provided for reducing ice mass on an aircraft engine. A compressor inlet temperature and pressure sensor measures total temperature and total pressure at the inlet to the engine compressor. An ice shield is provided, wherein a plurality of wedge portions has multiple protrusions for promoting ice formation in multiple locations. The ice shield is separable from the sensor with which it interfaces. The ice shield comprises straight angle wedge shapes and curved surfaces to separate and minimize ice accretion in desired locations. The mass of each resultant ice formation is reduced to a size that the compressor inlet blades can withstand without deformation.

8 Claims, 5 Drawing Sheets

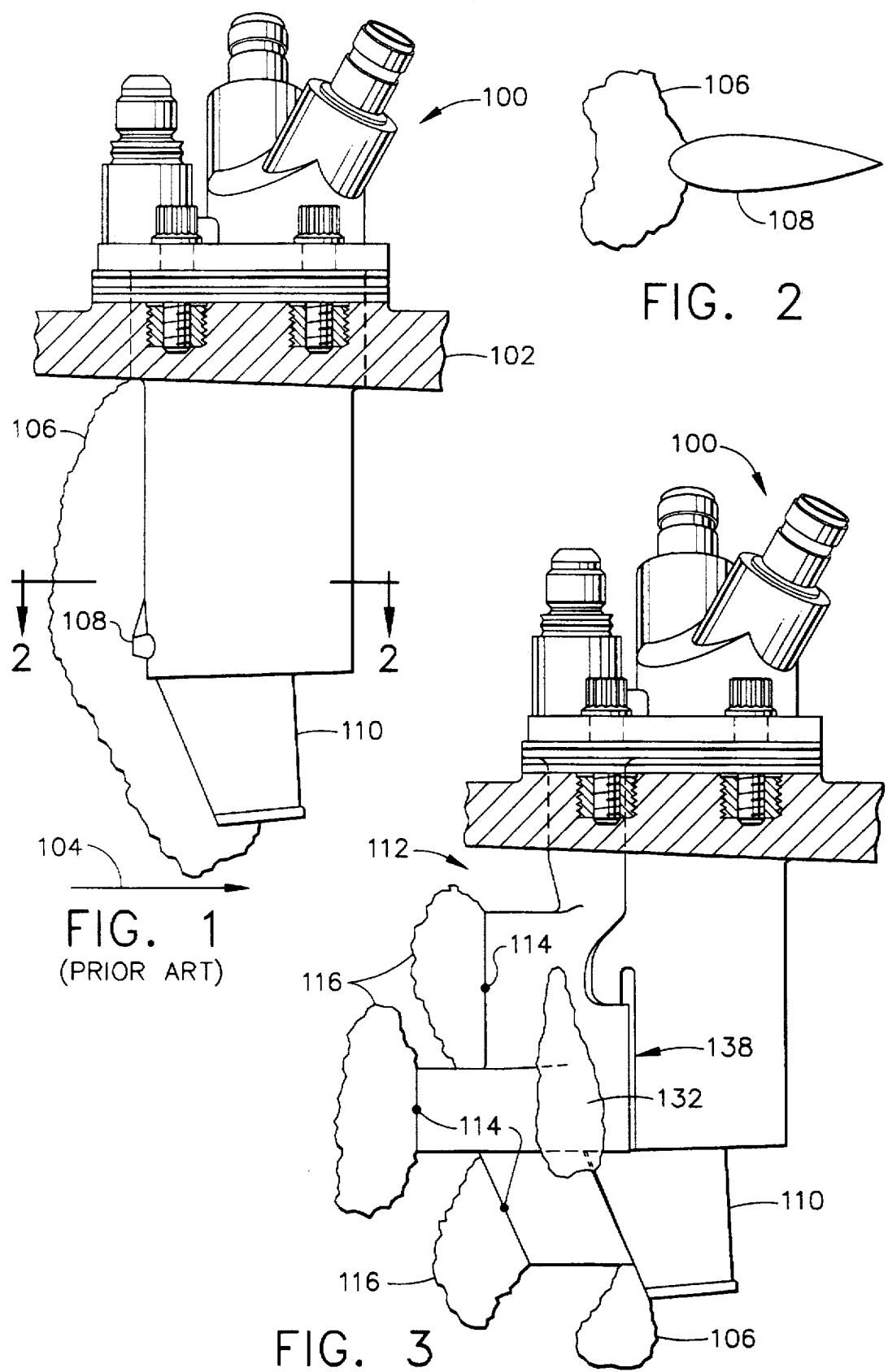

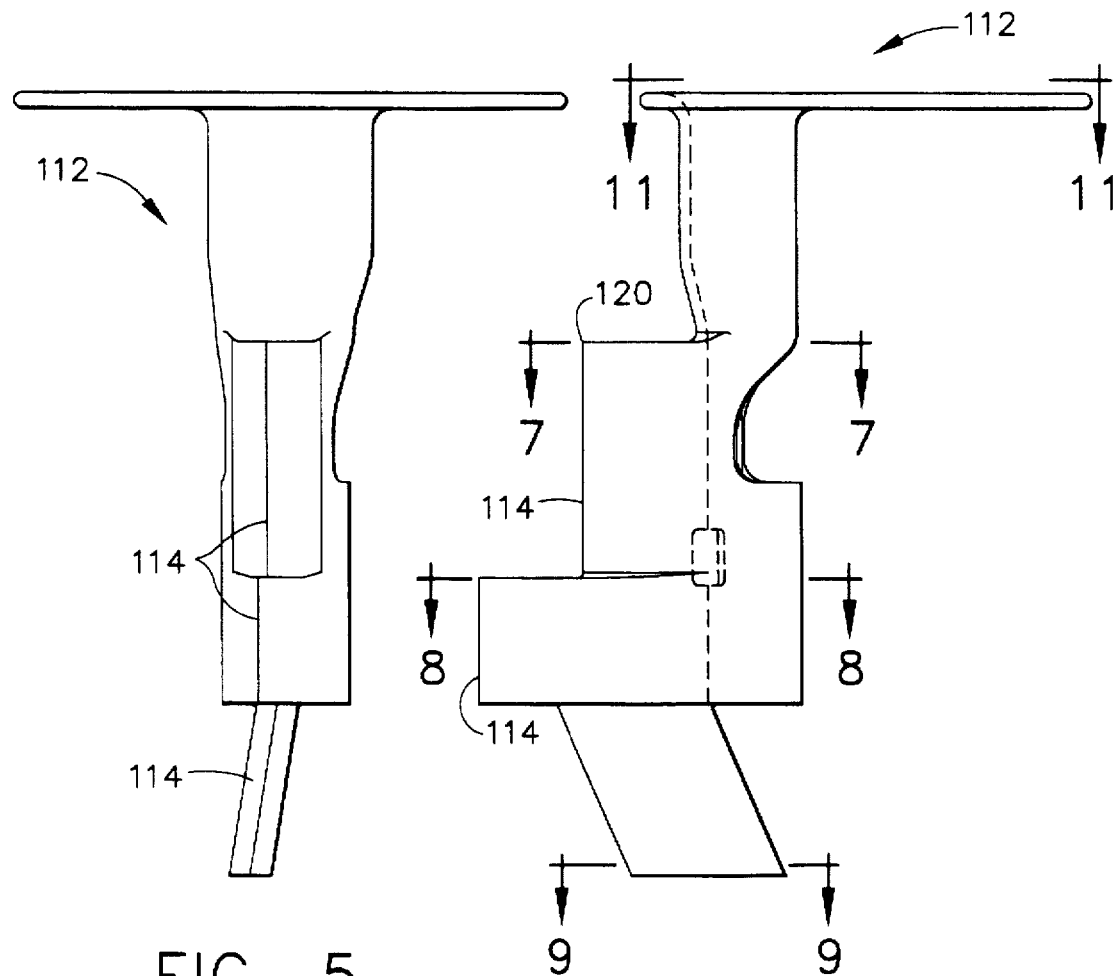
FIG. 5
FIG. 4
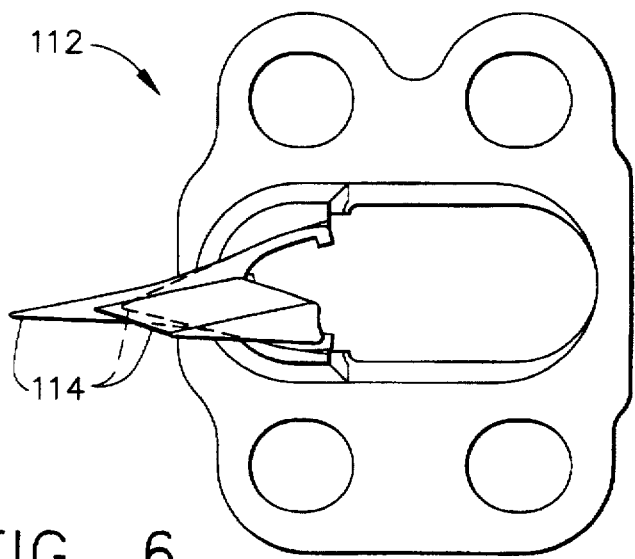
FIG. 6

SENSOR ICE SHIELD

TECHNICAL FIELD

The present invention relates, in general to jet aircraft engines and, more particularly, to an ice guard for such engines.

BACKGROUND OF THE INVENTION

In aircraft engines, such as the General Electric GE90 engine, a compressor inlet temperature sensor (T25) is used to measure both total temperature and total pressure at the inlet to the compressor. The inlet temperature is critical for establishing the variable geometry of the stators in the compressor.

During icing testing on the GE90 engine, it was determined that the compressor inlet temperature sensor built up or accreted ice. The size of the ice accumulated is important to the first stage blades of the compressor. The release of this accumulated ice causes non-serviceable damage to the compressor blades.

The location of the ice accretion on the sensor with respect to the trajectory into the blades is also important. Release of this ice as a single piece or release of the "upper" or strut part of the ice can cause major damage to the compressor blades.

The objects, features and advantages of the present invention will become more readily apparent in the following description when taken in conjunction with the appended drawings.

SUMMARY OF THE INVENTION

The present invention optimizes engine performance by reducing the largest single ice mass that can accumulate on the compressor inlet temperature sensor which measures total temperature and total pressure at the inlet to the compressor. The present invention reduces the amount of ice accretion on the strut of the sensor and the amount of ice accretion on the sensing element or airfoil portion of the sensor. The present invention is adaptable for use with any aircraft engine.

Briefly, in accordance with one aspect of the present invention, a system is provided for reducing ice mass on an aircraft engine. A compressor inlet temperature and pressure sensor measures total temperature and total pressure at the inlet to the engine compressor. An ice shield is provided, wherein a plurality of wedge portions has multiple protrusions for promoting ice formation in multiple locations. The ice shield is separable from the sensor with which it interfaces. The ice shield comprises straight angle wedge shapes and curved surfaces to separate and minimize ice accretion in desired locations. The mass of each resultant ice formation is reduced to a size that the compressor inlet blades can withstand without deformation.

In the drawings as hereinafter described, a preferred embodiment is depicted; however, various other modifications and alternative constructions can be made thereto without departing from the true spirit and scope of the invention.

BRIEF DESCRIPTION OF THE DRAWINGS

The novel features of the invention are set forth with particularity in the appended claims. The invention itself, however, both as to organization and method of operation, together with further objects and advantages thereof, may best be understood by reference to the following description taken in conjunction with the accompanying drawings in which:

FIG. 1 is a side elevational view of a prior art intercompressor temperature and pressure probe mounted through a fragmentary section view of a compressor case;

FIG. 2 is a diagrammatic section taken along line 2—2 of FIG. 1 illustrating typical lateral extent of ice formation;

FIG. 3 is a side elevational view of the probe of FIG. 1 fitted with a preferred embodiment of an ice shield, in accordance with the present invention;

FIG. 4 is a side elevation view of the ice shield of FIG. 3;

FIG. 5 is a front elevation view of the ice shield of FIG. 3;

FIG. 6 is a distal end view of the ice shield of FIG. 3;

DETAILED DESCRIPTION OF THE INVENTION

Figure 7:
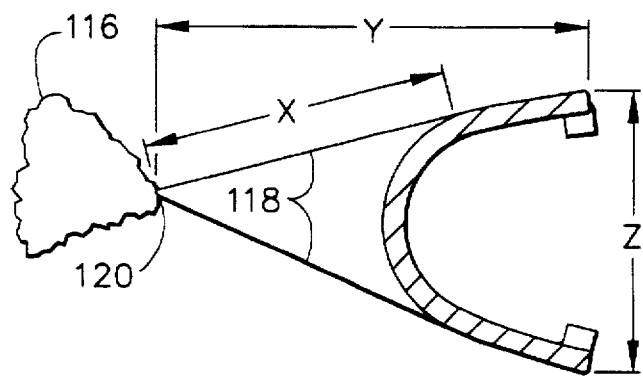
FIG. 7 is a section view without background taken along line 7—7 of FIG. 4.

Referring to the drawings, in FIG. 1 there is illustrated a side elevational view of a prior art intercompressor temperature and pressure probe 100. The probe 100 is mounted through a fragmentary section view of a compressor case 102, between a low pressure compressor of an aircraft engine and a high pressure compressor of an aircraft engine. Air flow is from left to right of FIG. 1, in the direction of arrow 104. Ice buildup 106 is depicted on the leading edge of the probe 100. The probe further comprises pressure port 108, and a complex sensing device 110 for measuring fluid temperature.

When the aircraft is flying at its desired altitude and speed, the low pressure compressor supplies sufficient hot air to prevent the formation of ice 106. However, when the aircraft is descending, the engine speed is obviously decreasing. The low pressure compressor no longer supplies sufficient hot air to prevent the formation and buildup of ice 106. Hence, ice 106 typically forms during throttle back descent.

FIG. 2 is a diagrammatic section taken along line 2—2 of FIG. 1 illustrating typical lateral extent of ice 106 formation. The ice 106 is typically a solid, crystalline formation, which grows out laterally, at an approximately 45° angle. This ice eventually breaks off probe 100 and travels through the downstream, high pressure compressor. The volume of ice is large enough to cause damage to the downstream compressor blades.

Referring now to FIG. 3, the present invention comprises an ice shield 112, as a separable element that when installed, becomes integral to the existing compressor inlet temperature and pressure sensor 100. FIG. 3 is a side elevational view of the probe 100 of FIG. 1, fitted with a preferred embodiment of ice shield 112. FIGS. 4, 5 and 6 are side elevation, front elevation and distal end views, respectively, of the ice shield 112 of FIG. 3. The ice shield 112 preferably comprises disassociated features, or wedge shapes 114, which promote ice formation in multiple locations. The disassociated features have the advantage of causing smaller ice formations 116 that do not contain enough mass upon break off to damage the downstream compressor.

Figure 8:
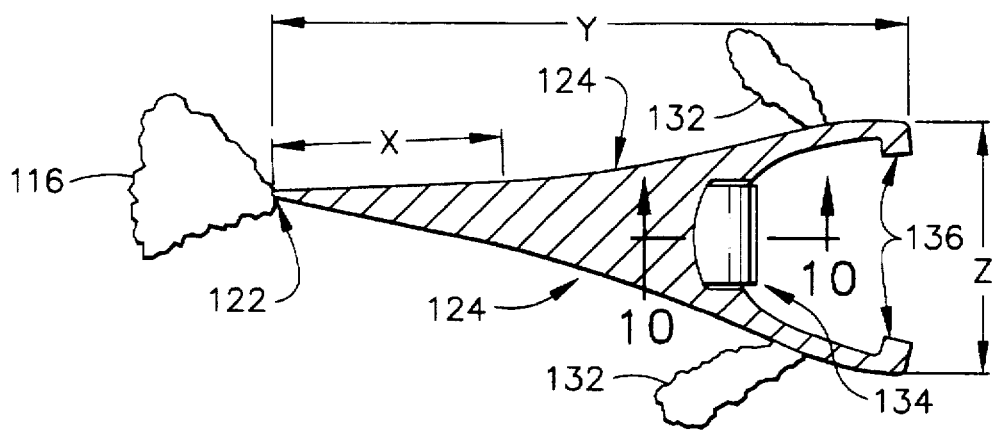
FIG. 8 is a section view without background taken along line 8—8 of FIG. 4.

FIG. 7 is a section view without background taken along line 7—7 of FIG. 4, and FIG. 8 is a section view without background taken along line 8—8 of FIG. 4. The forward portion of the wedge is formed by straight sides 118 for a distance x. This promotes ice formation 116 only at point 120 of the wedge, rather than along both entire sides 118. This ice formation builds out triangularly because sides 118 are straight lines. If, for example, sides 118 comprised concave lines, the ice would form at the tip 120 and also at the curvaceous surfaces along sides 118. The distance as measured along x is not sufficient to promote separate ice formations and would also lead to a more abrupt transition angle as measured along the curve. This abrupt transition forces an increasing change in static pressure, allowing ice to form. The aspect ratio of the wedge section of FIG. 7, as determined by the dimensions y/z, is not sufficient for the wedge to incorporate a curved transition. This, of course, would result in much larger ice formations, more securely attached to the wedge. Hence, when those ice formations did break off, they would, in fact, be large enough to cause damage to the downstream compressor. Promoting ice buildup 116 just at the tip 120, also promotes premature ice break off, and ice break off of smaller mass. The geometry of the invention and the need to keep the wedge point 120 axially (as measured with respect to the flow stream 104 in FIG. 1) separated from the wedge point 122 is the reason the included angle at point 120 is preferably greater than 15°. The 15° angle is one optimum angle to entice the ice buildup to shed or release from the wedge. However, ice buildup per unit length of wedge appears to be equivalent for any sharp angle between 15° and 45°.

Figure 9:
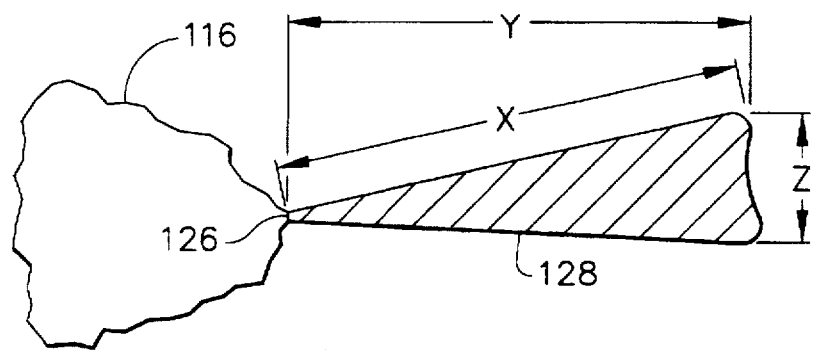
FIG. 9 is a section view without background taken along line 9—9 of FIG. 4.

In FIG. 8, the forward portion of the wedge is again formed by straight sides for a distance x, followed by curvaceous surfaces 124 that promotes a secondary ice formation 132 near the trailing edge of the part. The aspect ratio y/z for this wedge is optimized such that the ice accretion on point 122 is distinct and separate from the smaller ice masses built up on surfaces 124. In a preferred embodiment, the point 122 incorporates an included angle of 15° which will allow the ice buildup to shed under aerodynamic and vibratory forces. Likewise, the wedge shape shown in FIG. 9 rests directly in front of the temperature sensing device 110 of FIG. 1 and incorporates both the straight line x value and the aspect ratio y/z to collect ice on point 126, but not on sides 128.

The ice formations 116 and 132 are the result of the relatively sharp point and geometry of the wedge 114 and the aerodynamic force imparted to the ice on each side of the wedge. These aerodynamic forces will cause the ice on each side of the wedge to fracture at the point of the wedge where the ice has connected itself, but in much smaller individual masses than at tip 122. The 15° included angle at point 122 and the relatively sharp point at the tip 122 both cause the base of the attached ice mass 116 to be small. This base of the ice mass 116 is not wide enough to hold the ice against the aerodynamic forces and therefore releases. The largest single piece of ice that can strike the compressor blade from this area is much reduced. This allows the ice to move through the downstream compressor without damaging the compressor blades.

Continuing with FIGS. 3-9, the ice shield 112 of the present invention reduces the size of the single largest ice mass that can form on any portion of the ice shield or sensor combination. Furthermore, the ice shield 112 of the present invention reduces the total ice that accretes. The geometry of the wedge, as illustrated in FIGS. 3-9, is such as to allow for less ice per axial length to form. This is due to the flow streamlines and minimized stagnation areas. Where the entrained water in the incoming air passes by the point of the wedge and starts to follow the streamline down the side of the wedge is where the ice will begin to accumulate. It then accretes outward from the wedge and forward to the point of the wedge to connect itself with the ice accreting on the opposite side of the wedge. When the wedge total included angle is small enough, approximately 15°, the aerodynamic force acting on the growing ice piece is large enough, and the foothold or base of the ice is small enough, to force the ice to release before the ice mass becomes too large. This phenomenon further helps to reduce the largest physical size of a single ice piece that can be released from the probe 100 and the ice shield 112 and impact the compressor blades.

The ice shield is designed as a separate part to allow a sharper and longer wedge to be installed through an original, existing, small aperture in the fan frame hub structure, and inserted into the flow stream. A sharper and more effective wedge is achievable with the separate ice shield 112 than if the wedge were made integral to the probe 100.

The design of the unique and separate wedge areas is such as to equalize the individual ice masses. The ice masses depicted by ice buildups 116 and 106 in FIG. 3 are all approximately the same size. The ice buildup 132 in FIG. 3 is slightly smaller. This characteristic is due to the unique shape, location, and orientations of the wedge shapes 114.

The ice shield incorporates keys 136 in FIG. 8 that fit into keyways 138 on the modified sensor 110, as shown in FIG. 3. These keys help support the ice shield and prevent and arrest any twisting moment that may tend to occur on the wedges due to the air flow 104 in FIG. 1.

Figure 10:
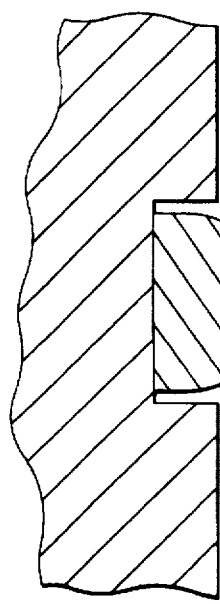
FIG. 10 is a section view taken along line 10—10 of FIG. 8.
Figure 11:
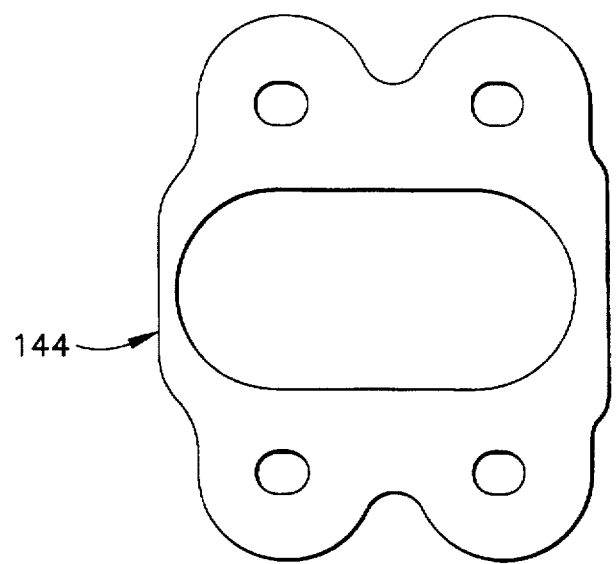
FIG. 11 is a bottom view of a metal spacer plate used in a vibration damping mounting assembly, in accordance with the present invention.
Figure 12:
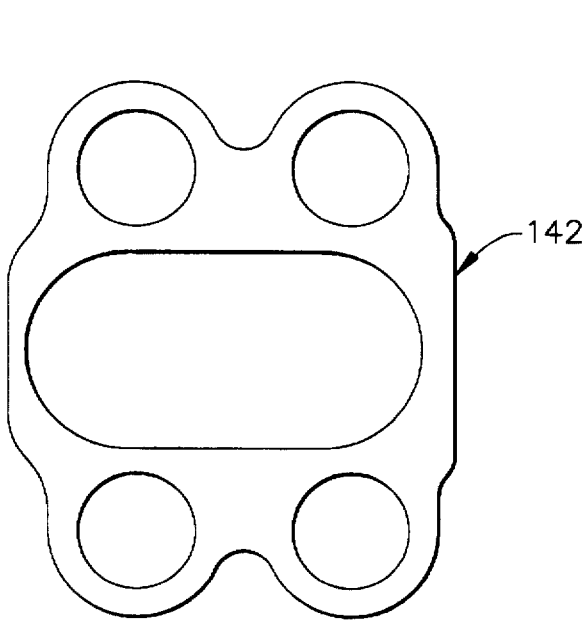
FIG. 12 is a bottom view of a first rubber pad used in the vibration damping mounting assembly.
Figure 13:
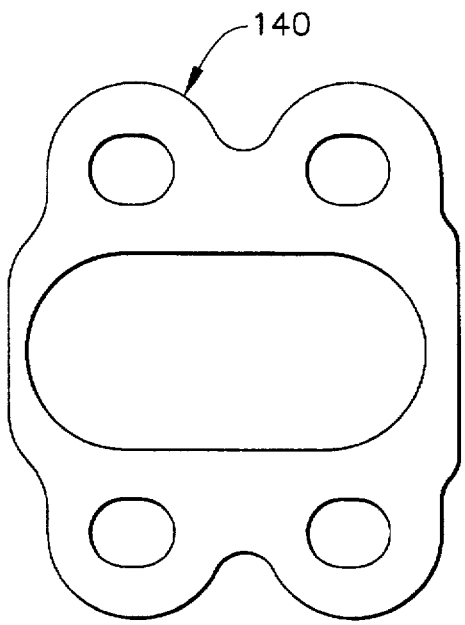
FIG. 13 is a second rubber pad used in the vibration damping mount assembly.

FIG. 10 shows rubber bumper 134 installed into the ice shield at section 8—8 of FIG. 4 and also shown in cross section in FIG. 8. This bumper 134 is bonded to the ice shield and is squeezed or compressed when probe 100 of FIG. 3 is inserted into ice shield 112 in FIG. 3. This compression serves to reduce the overall vibration amplification of shield 112 in conjunction with and relative to probe 100. The compression also serves to preload keys 136 into keyways 138 to reduce relative motion and possible wear.

Figure 14:
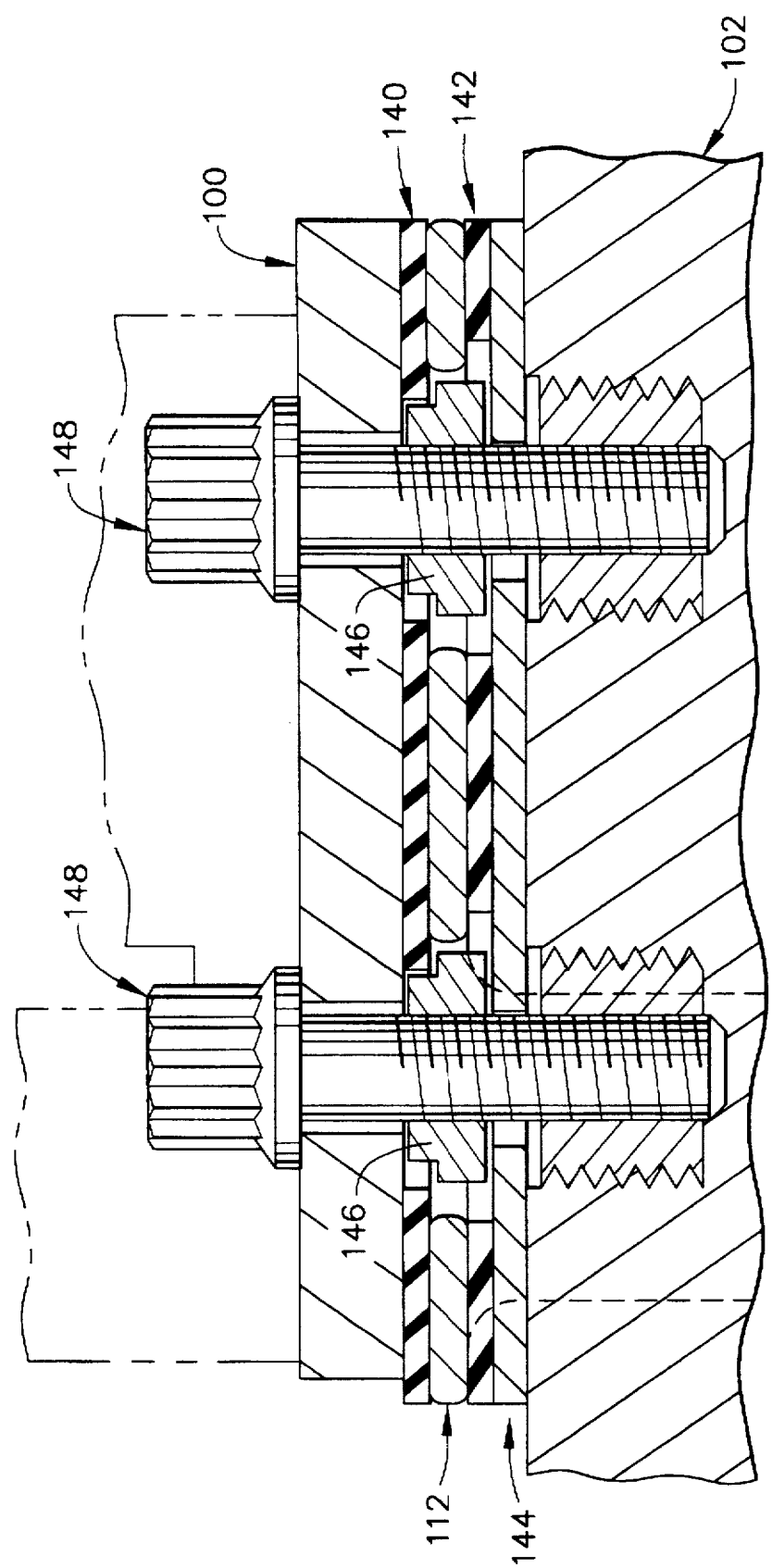
FIG. 14 is a section view taken through a pair of longitudinally disposed mounting bolts associated with the vibration damping mount assembly.

The mounting of ice shield 112 into fan frame aperture 102 with the sensor 100 installed into the shield is shown in FIG. 14. The top and bottom rubber pads 140 and 142, are chemically bonded to the shield 112 and a metal spacer 144 is bonded to rubber pad 142 to form an assembly. Metal washers 146, one at each of four bolts, are not bonded to shield 112 and are left loose to float or move. The top rubber pad 140 incorporates a smaller hole than the bottom pad 142 and serves to contain or capture washers 146 so they are retained as part of the final and complete ice shield assembly.

To mount the ice shield to the engine, shield 112 is inserted first through the fan frame 102. Next, sensor 100 is inserted into shield 112 and retaining means, such as bolts 148, are inserted through sensor 100 and washers 146 and through metal spacer 144, to screw into fan frame 102. When bolts 148 are tightened, the rubber pads 140 and 142 are compressed with the amount of compression controlled by the height of washers 146 and the step cut on such washers, at their top. Sensor 100 finally comes to rest on metal spacer 144, which rests on fan frame 102. Rubber pads 140 and 142 provide vibration damping while washers 146 and spacer 144 provide for clamping of the sensor to the fan frame 102. This clamping becomes a metal to metal clamp and therefore prevents screws 148 from backing out.

While preferred embodiments of the present invention have been shown and described herein, it will be obvious to those skilled in the art that such embodiments are provided by way of example only. Numerous variations, changes, and substitutions will now occur to those skilled in the art without departing from the invention. For example, the ice shield design may incorporate a separable piece design and a mounting flange support. Furthermore, the style, size and shape of the wedge or wedges can differ greatly without departing from the scope of the invention, as long as the wedge or wedges provide distinct and separate locations for the ice buildup, thus creating smaller masses of ice, as compared to the sensor alone. Accordingly, it is intended that the invention be limited only by the spirit and scope of the appended claims.

We claim:

1. A system for reducing ice mass on an aircraft engine having an engine compressor, the system comprising:

a compressor inlet temperature and pressure sensor for measuring total temperature and total pressure at an inlet to the engine compressor;

a plurality of wedge portions having multiple protrusions for promoting ice formation;

mounting means for mounting the plurality of wedge portions to the sensor.

2. A system for reducing ice mass as claimed in claim 1 wherein the plurality of wedge portions having multiple protrusions promote ice formation in multiple locations.

3. A system for reducing ice mass as claimed in claim 1 wherein the plurality of wedge portions in unison with the sensor promote growth of ice in masses of similar size.

4. A system for reducing ice mass as claimed in claim 1 wherein the compressor inlet temperature and pressure sensor comprises compressor inlet blades.

5. A system for reducing ice mass as claimed in claim 4 wherein the plurality of wedge portions reduce the ice formation to a size that the compressor inlet blades can withstand.

6. A system for reducing ice mass as claimed in claim 1 wherein the plurality of wedge portions comprise a straight angle tip that extends outward into curved surfaces.

7. A system for reducing ice mass as claimed in claim 6 wherein the straight angle tip and curved surfaces separate and minimize ice accretion at desired locations.

8. A system for reducing ice mass as claimed in claim 1 wherein the mounting means further comprises vibration damping.

* * * * *